(12) United States Patent
Vautier

(10) Patent No.: US 8,374,998 B2
(45) Date of Patent: Feb. 12, 2013

(54) COMPUTER IMPLEMENTED METHODS AND SYSTEMS TO FACILITATE RETRIEVAL AND VIEWING OF CALL CENTER CONTACT AND CUSTOMER INFORMATION

(75) Inventor: Nicholas Vautier, San Carlos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 377 days.

(21) Appl. No.: 11/456,468

(22) Filed: Jul. 10, 2006

(65) Prior Publication Data

US 2008/0010248 A1   Jan. 10, 2008

(51) Int. Cl.
   *G06F 7/00*   (2006.01)
(52) U.S. Cl. ......... 707/609; 707/705; 709/202; 715/700
(58) Field of Classification Search .................. None
   See application file for complete search history.

(56) References Cited

U.S. PATENT DOCUMENTS

| | | | |
|---|---|---|---|
| 6,006,215 A * | 12/1999 | Retallick | 1/1 |
| 6,760,727 B1 | 7/2004 | Schroeder et al. | |
| 6,829,350 B1 | 12/2004 | Trinkel et al. | |
| 7,076,499 B2 * | 7/2006 | Powers | 707/102 |
| 7,890,503 B2 * | 2/2011 | Murarka et al. | 707/728 |
| 2003/0135477 A1 | 7/2003 | Elsey et al. | |
| 2004/0119732 A1 * | 6/2004 | Grossman et al. | 345/708 |
| 2004/0199541 A1 | 10/2004 | Goldberg et al. | |
| 2005/0055321 A1 | 3/2005 | Fratkina et al. | |
| 2005/0086291 A1 * | 4/2005 | Jadanovski et al. | 709/202 |
| 2005/0152529 A1 | 7/2005 | Kumar et al. | |
| 2006/0031077 A1 | 2/2006 | Dalton et al. | |
| 2006/0059129 A1 * | 3/2006 | Azuma et al. | 707/3 |

* cited by examiner

*Primary Examiner* — Fred I Ehichioya
*Assistant Examiner* — Hasanul Mobin
(74) *Attorney, Agent, or Firm* — Kilpatrick Townsend & Stockton LLP

(57) ABSTRACT

A computer-implemented method of enabling a customer service agent to retrieve customer and contact information from a database coupled to a computer system may include receiving a communication from a person; asking the person to provide contact details and a customer, if any, with which the person is affiliated; entering search criteria that include the provided contact information and/or customer affiliation into the computer system to retrieve matching customer and contact information from the database; searching the database to retrieve all customers and contacts that match at least one of the entered search criteria, and viewing, on a single screen displayed by the computer system, a first search results box that is configured to display information relating to contacts retrieved from the database and a second search results box that is configured to display information relating to customers retrieved from the database.

22 Claims, 17 Drawing Sheets

FIG. 1

Search For Customer

| Name | Begins with ▶ | Club Fit ~102 |
| First Name | Begins with ▶ | Alan ~104 |
| Last Name | Begins with ▶ | |
| Customer ID | Begins with ▶ | |
| Phone | = ▶ | |
| Email | = ▶ | |
| Address | Begins with ▶ | |
| City | = ▶ | |
| State | = ▶ | |
| Postal | = ▶ | |
| Country | = ▶ | |

Search ①    Clear    Cancel

No search results were found ~106 ②

Select Action [Create Company With Contact ▶]    Go ③

Home   Logout   Help

Copyright 2006 XYZ CO

FIG. 2

Create Company With Contact

Create Company With Contact | *Create Consumer*

Company

Name  Club Fit ↙ ②─202
Currency  US Dollar

Q Search Existing Company ─204
②

Purchasing Options

☑ Sold to Customer    This Company can make purchases
☑ Bill to Customer    This Company can receive bills
☑ Ship to Customer    This Company can receive shipments Address  Q Look up Address Type  Business  ▶
Physical Location  Begins with
Country  United States  ▶
Address 1
Address 2

Contact Info

Description  Business
Phone

| Type | Cntry Code | Num | Ext |
|---|---|---|---|
| Main ▶ | | | |
| Cellular ▶ | | | |
| Fax ▶ | | | |
| Pager ▶ | | | |

FIG. 3

File   Edit   View   Go   Help   _ □ X

Search For Company

▶ Search

Company [Begins with ▶] [Club Fit] ← ① — 302
First Name [Begins with ▶] [          ]
Address [=  ▶] [          ]
City    [=  ▶] [          ]
State   [=  ▶] [          ]
Postal  [=  ▶] [          ]
Country [=  ▶] [          ]

[Search] ← ②    [Clear]    [Cancel]

Search Results                                                    304

| Company | Address | City | State | Postal |
|---------|---------|------|-------|--------|
| Club Fit ← ③ | 1234 Main Street<br>Anytown, CA<br>92345, USA | Anytown | CA | 92345 |

Home   Logout   Help

Create Company With Contact

Create Company With Contact | Create Consumer

Company

Search Existing Company
Name Club Fit
Currency US Dollar

Purchasing Options

☑ Sold to Customer — This Company can make purchases
☑ Bill to Customer — This Company can receive bills
☑ Ship to Customer — This Company can receive shipments

Contact Info

Description Business      Address  1234 Main Street
Phone 800/123-4567                 Anytown, CA
                                   92345, USA

[Clear]

Contact

Search Existing Person ~404
Format for United States ② 
Currency US Dollar ~402
First Name Alan        Middle Name
Last Name Fletcher ①   Suffix

Contact Info

Contact Info

Description: Business
Phone — 502

| Type | Area Code | Num | Ext |
| Main | 650 | 506-7000 | |
| Cellular | | | |
| Fax | | | |
| Pager | | | |

Email — 504

| Type | Email Address |
| Business | |
| Other | |

Address — 506

☐ Use Company Address

🔍 Look up Address

Type: Business
Physical Location: Begins with
Country: United States
Address 1:
Address 2:
City:
County:
State:
Postal:
Time Zone:
Region:

[Address Look up]

[Save] [Cancel]

FIG. 7

File  Edit  View  Go  Help

Search For Customer

| Name | Begins with ▶ | SoftGear | ←① |
| First Name | Begins with ▶ | Jed | ←② |
| Last Name | Begins with ▶ | | |
| Customer ID | Begins with ▶ | | |
| Phone | = ▶ | | |
| Email | = ▶ | | |
| Address | Begins with ▶ | | |
| City | = ▶ | | |
| State | = ▶ | | |
| Postal | = ▶ | | |
| Country | = ▶ | | |

[Search] [Clear] [Cancel]

No search results were found ~706

Select Action [Create Company With Contact ▶]  [Go]

Copyright 2006 XYZ CO     Home  Logout  Help

FIG. 8

File  Edit  View  Go  Help

Search For Customer

Name [Begins with ▶] [SoftGear                ] ~802
First Name [Begins with ▶] [                    ]
Last Name [Begins with ▶] [                    ]
Customer ID [Begins with ▶] [                  ]
Phone [= ▶] [                                  ]
Email [= ▶] [                                  ]
Address [Begins with ▶] [                      ]
City [= ▶] [                                   ]
State [= ▶] [                                  ]
Postal [= ▶] [                                 ]
Country [= ▶] [                                ]

[Search]①  [Clear]  [Cancel]

Search Results  ~804

| Company | Address | City | State | Postal | Country |
|---|---|---|---|---|---|
| SoftGear, Inc. | 1234 Cowgirl Cove | Dallas | TX | 75214 | USA |
| SoftGear International LTD ② | 1234 American Way | Philadelphia | PA | 17234 | USA |

360-Degree View

File  Edit  View  Go  Help                                    _ □ x

360-Degree View

Role Company ▼    Relationship Viewer    Go To ▼    Tasks    Go

Summary

Name     SoftGear, Inc.
Address  2345 Pinehurst Rd. New York, NY 95054        Phone          212-555-5555
Email
Segment  Bronze                                       Customer Value PLATINUM

Activities

Date Filter 6 – Last Year ▼

Recommendations

| Product | Score | Date |
|---|---|---|
| Fast Wireless Router | 85 | 2006-02-23 |
| Mobile Phone Wall Charger | 60 | 2006-02-23 |
| Mobile Phone Car Charger YB2 | 60 | 2006-02-23 |
| Mobile Phone HandsFree YB | 60 | 2006-02-23 |
| Mobile Phone Leather Case | 60 | 2006-02-23 |

Financial Profile

Credit Limit         0 USD
Credit Risk          Medium
Credit Hold          N
Account Status       Active
Outstanding Balance  12999 USD
Past Due Balance     12999 USD
Total Deduction      0 USD Overview of - SoftGear, Inc.
Recommendations (5)
Agreements (2)
Contacts (5) ~902
①nstalled Products (23)
Support Cases (0)
Defects (0)

*FIG. 9*

File　Edit　View　Go　Help

Create Contact of SoftGear, Inc.

Company
  Name SoftGear, Inc.
  Currency US Dollar ▶

Contact Info
  Description Business ▶    Address   1234 Cowgirl Cove
  Phone 212-555-5555                   Dallas, TX 75214

Contact
  🔍 Search Existing Person
  Format for United States
  Prefix              Middle Name
  First Name Jed      Suffix
  Last Name Pottage
  ~1102
  ①

Contact Info
  Description Business
  Phone
  Type       Cntry Code   Num              Ext
  Main ▶                  650-555-255
  Cellular ▶
  Fax ▶
  Pager ▶

Address
  ☐ Use Company Address
  🔍 Look up Address
  Type Business ▶
  Physical Location
  Country United States ▶
  Address 1

*FIG. 11*

360-Degree View

Summary

Role Contact of SoftGear, Inc. ▼

| | | | |
|---|---|---|---|
| Name | Jed Pottage | Customer | SoftGear, Inc. |
| Address | | Phone | 212-555-5555 |
| Email | | Customer Value | PLATINUM |

Recommendations

| Product | Score | Date |
|---|---|---|
| Fast Wireless Router | 85 | 2006-02-23 |
| Mobile Phone Wall Charger | 60 | 2006-02-23 |
| Mobile Phone Car Charger YB2 | 60 | 2006-02-23 |
| Mobile Phone HandsFree YB | 60 | 2006-02-23 |
| Mobile Phone Leather Case | 60 | 2006-02-23 |

Financial Profile

| | |
|---|---|
| Credit Limit | 0 USD |
| Credit Risk | Medium |
| Credit Hold | N |
| Account Status | Active |
| Outstanding Balance | 12999 USD |
| Past Due Balance | 12999 USD |
| Total Deduction | 0 USD |

Activities

Date Filter 6 – Last Year ▼

- Overview of - Jed Pottage
- Recommendations (5)
- Agreements (2)
- Installed Products (23)
- View All
- Add Case ~ 1202
- Search Cases
- Support Cases (0)
- Defects (0)
- Orders (0)

Customer Search

Contact First Name: sam — 1502
Contact Last Name: Hud — 1504
Organization Name: Business World — 1506

Phone:
Email:
Customer Number:

Clear All   Go (3)

▲ Show More Search Options

Contacts for Multiple Customers — 1508

Select Contact | Create Service Request ▼   Go (5)

| Select | Name | Customer | Address | Phone | Email | View Details |
|---|---|---|---|---|---|---|
| (4) | Samantha Hudson | Business World | 100 Maple Street, Glenn, AU | | SH@bw.com | |
| ○ | Samuel Hud | Business World | 300 Pine Ln, Sheppard, NZ | | SHud@bw.com | |
| ○ | Samuel Hudsucker | Business World | 200 Rue des Peupliers, Grissom, FR | | SamH@bw.com | |

Customer Results — 1510

Select Customer | View Customer Overview ▼   Go

| Select | Name | Address | Phone | Create Contact | View Contacts | View Details |
|---|---|---|---|---|---|---|
| ⊙ | Business World | 100 Maple Street, Glenn, AU | | | | |
| ○ | Business World | 300 Pine Ln, Sheppard, NZ | | | | |
| ○ | Business World | 200 Rue des Peupliers, Grissom, FR | | | | |

Create Customer   Cancel

| File | Edit | View | Go | Help | | | _ □ ×|

Customer Search

Contact First Name [ ]  Phone [ 6505067000 ] ① — 1602
Contact Last Name  [ ]  Email [ ] — 1604
Organization Name [ ]  Customer Number [ ] — 1606

▲ Show More Search Options    Clear All   [Go] ②

Contacts for Multiple Customers ——— 1608

Select Contact | View Contact Overview ▼ | [Go] ④ one
| Select | Name | ⓷ ess | Phone | Email | View Details |
|---|---|---|---|---|---|
| ⊙ ③ | Carmen Mirn | CREATE SERVICE REQUEST Rico Suave | (650) 506-7000 | Carmen.mirn@234d.com | 🏠🏠 |
| ○ | Sanjay Poang | Sanjay Org | (650) 506-7000 | Sp@234fcsd.com | 🏠🏠 |

Customer Results ——— 1610

Select Customer | View Customer Overview ▼ | [Go]  [Create Customer]
| | | Show All Contacts for Cust. | | | |
| Select | Name | Address | Phone | Create Contact | View Contacts | View Details |
|---|---|---|---|---|---|---|
| ⊙ | Rico Suave | | (650) 506-7000 | 👤 | 👥 | 🏠🏠 |
| ○ | Carmen Weird | | (650) 506-7000 | 👤 | 👥 | 🏠🏠 |

[Cancel]

*FIG. 16*

COMPUTER IMPLEMENTED METHODS AND SYSTEMS TO FACILITATE RETRIEVAL AND VIEWING OF CALL CENTER CONTACT AND CUSTOMER INFORMATION

BACKGROUND OF THE INVENTION

1. Field of the Invention

Embodiments of the present invention relate to the field of computer-implemented methods and systems for facilitating call center operations. More particularly, embodiments of the present invention relate to methods and systems for facilitating and improving searching, retrieving, viewing and acting upon customer and contact records.

2. Description of the Prior Art and Related Information

Whenever someone calls a toll free number to obtain service or order a product, the person on the other end of the line is likely a customer service agent working in a call or contact center. Searching for and possibly creating a new record for a customer is probably the most common function of customer service agents, as a customer record is required for order capture, service request and all but the simplest contact center functions. Cost is a huge concern for most call centers (or contact centers, as the two terms are used interchangeably herein). For call centers, time truly is money. One large call center has calculated that every second added to every call increases the cost of operations by around a million dollars. When evaluating call center management software, call center IT professionals pay close attention to the efficiency of the software in handling calls and retrieving the necessary information to enable the customer service agent to efficiently field and process calls. One of the problems faced by call centers is that that agents must efficiently identify both the customer (the party with whom the business relationship is to be or has been established) and the contact (the party who is contacting the contact center on behalf of the customer). Contact centers that handle corporate accounts usually identify a contact that is different from the customer. Even small delays (e.g., extra steps carried out by the customer service agent) in identifying the correct contact and customer degrades the quality of service provided by the customer service agent and incurs non-negligible costs that must be borne by the call center. From the foregoing, it may be appreciated that improved methods and systems are needed for searching for, displaying and creating customer and contact information.

SUMMARY OF THE INVENTION

According to an embodiment thereof, the present invention is a computer-implemented method for a customer service agent to retrieve and view customer information and contact information from a database coupled to a computer system. The contact information may include a name of a person contacting the customer service agent and the customer information including an identity of an entity on behalf of which the person is calling, if different from the contact information. The method may include steps of receiving a communication from a person; asking the person from whom the communication was received to provide contact details and a customer, if any, with which the person is affiliated; entering search criteria that include at least one of the provided contact information and customer affiliation into the computer system to retrieve matching customer and contact information from the database; causing the computer system to search the database based upon the entered search criteria and to retrieve all customers and contacts from the searched database that match at least one of the entered search criteria, and viewing, on a single screen displayed by the computer system, a first search results box that is configured to display information relating to contacts retrieved from the database as a result of the search of the database and a second search results box that is configured to display information relating to customers retrieved from the database as a result of the search of the database.

According to further embodiments, the viewing step may be carried out with first search results box displaying all contacts retrieved from the database and the method may further include a step of the customer service agent selecting one of the displayed contacts. The viewing step may be carried out with the first search results box further displaying a selection of possible actions that the customer service agent may take on the selected one of the displayed contacts. The selection of possible actions displayed in the first search results box may include viewing detailed contact information, updating contact information, creating an order and creating a service request for the selected one of the displayed contacts. A step of the customer service agent creating a service request for a contact displayed in the first search results box from the screen may also be carried out. The viewing step may be carried out with second search results box displaying all customers retrieved from the database and the method further may include a step of the customer service agent selecting one of the displayed customers. The viewing step may be carried out with the second search results box further displaying a selection of possible actions that the customer service agent may take on the selected one of the displayed customers. The selection of possible actions displayed in the first search results box may include, for example, viewing detailed customer information, updating customer information, creating a service request for the selected one of the displayed customers, creating an order and viewing all contacts for a selected customer and/or any related action. A step may be carried out of the customer service agent creating a service request for a customer displayed in the second search results box from the screen.

According to another embodiment thereof, the present invention is a computer-implemented method of enabling a customer service agent to retrieve and view customer information and contact information from a database coupled to a computer system, the contact information including a name of a person contacting the customer service agent and the customer information including an identity of an entity on behalf of which the person may be calling. The method may include steps of receiving search criteria that include at least one of contact details and a customer; initiating a search of the database coupled to the computer system to retrieve customer and contact information from the database that matches the search criteria; retrieving all customers and contacts from the searched database that match at least one of the entered search criteria, and providing to the customer service agent, on a single screen displayed by the computer system, a first search results box that may be configured to display information relating to contacts retrieved from the database as a result of the search of the database and a second search results box that may be configured to display information relating to customers retrieved from the database as a result of the search of the database.

The providing step may be carried out with first search results box displaying all contacts retrieved from the database and the method further may include a step of enabling the customer service agent to select one of the displayed contacts. The providing step may be carried out with the first search results box further displaying a selection of possible actions that the customer service agent may take on the selected one of the displayed contacts. The selection of possible actions displayed in the first search results box may include, for example, viewing detailed contact information, updating contact information, creating an order and creating a service request for the selected one of the displayed contacts and/or any related actions. A step may be carried out to enable the customer service agent to create a service request for a contact displayed in the first search results box from the screen. The providing step may be carried out with second search results box displaying all customers retrieved from the database and the method further may include a step of enabling the customer service agent to select one of the displayed customers. The providing step may be carried out with the second search results box further displaying a selection of possible actions that the customer service agent may take on the selected one of the displayed customers. The selection of possible actions displayed in the first search results box may include, for example, viewing detailed customer information, updating customer information, creating a service request for the selected one of the displayed customers, creating an order, viewing all contacts for a selected customer and/or any related actions. The method may also include a step of enabling the customer service agent to create a service request for a customer displayed in the second search results box from the screen. A step may be carried out of incorporating at least some of the received search criteria into selected fields of a new contact creation screen when the first search results box does not display the name of the person from whom the communication was received.

According to still another embodiment thereof, the present invention is a machine-readable medium having data stored thereon representing sequences of instructions which, when executed by a computing device, causes the computing device to enable a customer service agent to retrieve and view customer information and contact information from a database coupled to a computer system, the contact information including a name of a person contacting the customer service agent and the customer information including an identity of an entity on behalf of which the person may be calling, by performing the steps of receiving search criteria that include at least one of contact details and a customer; initiating a search of the database coupled to the computer system to retrieve customer and contact information from the database that matches the search criteria; retrieving all customers and contacts from the searched database that match at least one of the entered search criteria, and providing to the customer service agent, on a single screen displayed by the computer system, a first search results box that may be configured to display information relating to contacts retrieved from the database as a result of the search of the database and a second search results box that may be configured to display information relating to customers retrieved from the database as a result of the search of the database.

Still another embodiment of the present invention is a computer system for enabling a customer service agent to retrieve and view customer information and contact information from a database coupled to a computer system, the contact information including a name of a person contacting the customer service agent and the customer information including an identity of an entity on behalf of which the person may be calling. The computer system may include at least one processor; at least one data storage device coupled to the at least one processor; a plurality of processes spawned by said at least one processor, the processes including processing logic for: receiving search criteria that include at least one of contact details and a customer; initiating a search of the database coupled to the computer system to retrieve customer and contact information from the database that matches the search criteria; retrieving all customers and contacts from the searched database that match at least one of the entered search criteria, and providing to the customer service agent, on a single screen displayed by the computer system, a first search results box that may be configured to display information relating to contacts retrieved from the database as a result of the search of the database and a second search results box that may be configured to display information relating to customers retrieved from the database as a result of the search of the database.

Yet another embodiment is a computer application for enabling customer service agent to retrieve and view contact and customer information from a database, the computer application being configured to provide, on a single display screen, first means, displayed on the single display screen, for initiating a search of the database based upon search criteria that include at least one of contact details and a customer name; a first search results box, displayed on the single display screen, configured to display a list of selectable contacts retrieved from the database as a result of the search of the database; a second search results box, displayed on the single display screen, that may be configured to display a list of selectable customers retrieved from the database as a result of the search of the database, and second means, provided in the first search results box, for carrying out one of a plurality of predetermined actions for a contact selected from the list of selectable contacts displayed in the first search results box.

The plurality of predetermined actions may include, for example, viewing detailed customer information, updating customer information, creating a service request for the selected one of the displayed customers, viewing all contacts for a selected customer and/or any other related action.

BRIEF DESCRIPTION OF THE DRAWINGS

FIG. 1 shows aspects of a conventional method for a call center's customer service agent to search for and retrieving customer and contact information.

FIG. 2 shows aspects of a conventional method for a call center to create a company with a contact.

FIG. 3 shows aspects of a conventional method for a call center to search for a customer (company).

FIG. 4 shows further aspects of a conventional method for a call center to create a company with a contact.

FIG. 5 shows conventional aspects of a conventional implementation of a user interface for entering contact information.

FIG. 7 shows further aspects of a conventional implementation of a method for a call center to search for customers.

FIG. 8 shows further aspects of a conventional implementation of a method for a call center customer service agent to search for customers and to display the results of such search.

FIG. 9 shows aspects of a conventional method for a call center customer service agent to view customer information.

FIG. 11 shows aspects of a conventional implementation of a method for a customer service agent of a contact center to create a new contact for an existing customer.

FIG. 12 shows aspects of a conventional implementation of a method for a call center to enter a new case for a given contact and customer.

FIG. 14 shows aspects of a computer-implemented method for a call center to create a new contact, according to an embodiment of the present invention.

FIG. 15 shows aspects of a computer-implemented method for a call center to search for a customer, according to an embodiment of the present invention.

FIG. 16 shows aspects of another computer-implemented method for a call center to search for a customer, according to an embodiment of the present invention.

DETAILED DESCRIPTION

When someone calls a contact center, conventional implementations have the customer service agents initiate a search process that is configured to display either the customer or contact, but not both. This often results in a two step process. A first possible approach to this problem is to first identify the customer (e.g., Business World) and, in a separate subsequent step, identify the contact (if different from the customer such as, e.g., Amy calling on behalf of Business World). This second step adds time and unnecessary complexity. A second conventional approach to this problem is to cause a list of contacts and their associated customers to be displayed for the customer service agent. If no records are found, a second step is conventionally required to find or create the customer (Business World in the example developed herein), in order to associate a new contact (Amy in this example). The most common problem with this conventional approach is that new customers may be created without searching the system to see if a matching existing customer exists, which results in duplicate customer information which, in turn, creates immense burdens on down stream processes. Moreover, when creating a new customer, the previously obtained new contact information is lost and must be re-entered.

Figure 6:
FIG. 6 shows aspects of a conventional implementation of a user interface for viewing contact information.
Figure 10:
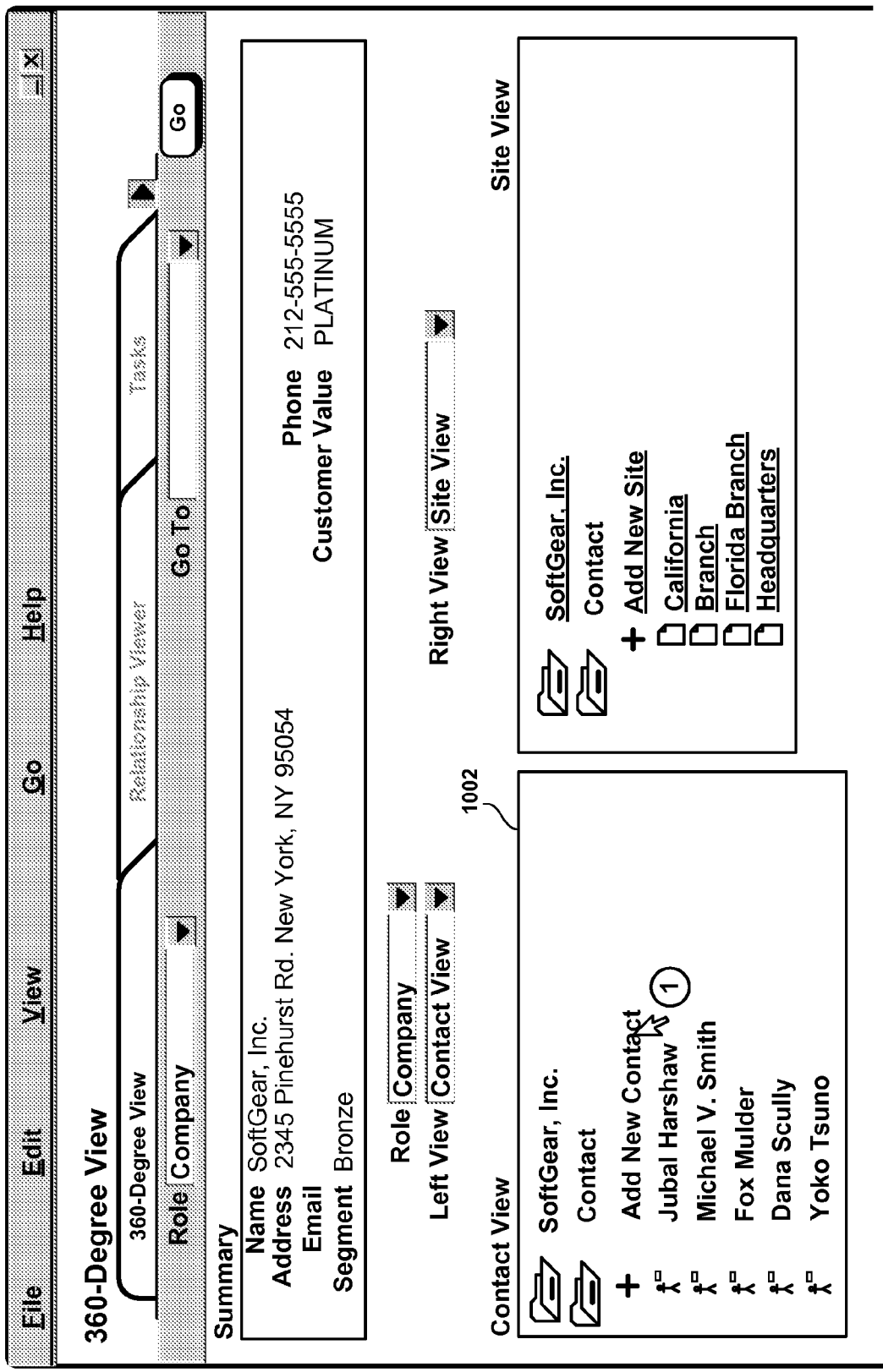
FIG. 10 shows aspects of a conventional implementation of a method for a customer service agent of a call center to view contact information for an existing customer.

To illustrate conventional implementations of searching and retrieving customer and contact information, reference is now made to FIGS. 1-11. In this exemplary scenario, a call center receives a call from Alan (the contact in this example), who states that he is calling on behalf of Club Fit (the customer in this example). As shown in FIG. 1, the customer center agent may search (as shown at (1)) for the contact by entering the customer and the contact at 102 and 104, respectively. As shown at 106, the search may not return any results, as shown at (2). The customer service agent may then create a new customer (Club Fit) with a new contact (Alan), as shown at (3). As shown in FIG. 2, the customer service agent may then re-enter the customer name 202 as shown at (1). To avoid duplicate entries, the customer service agent would then conventionally search customer records at 204 to determine if the "Club Fit" customer already exists in the customer database, as shown at (2). As shown in FIG. 3, the customer service agent may then be presented with yet another user interface screen, prompting him or her to re-enter the customer name at 302 as shown at (1), and to initiate a search on the customer name "Club Fit", as shown at (2). If the customer already exists and is returned in the search result box 304, the customer service agent may select the customer at (3). Once the customer service agent has found the customer in the database, he or she may now create a new contact for the existing customer—in this case, Club Fit. This is shown in FIG. 4. As shown therein, the customer service agent may enter the contact's name (Alan Fletcher) at 402, as shown at (1) and may, as an added precaution, search existing contacts at 404 and as shown at (2) in an effort to avoid duplication of contacts (as may occur, for example, if names are misspelled and such alternate spellings (e.g., Allen, Allan or Alain are not caught by phonetic filters or the like). FIG. 5 shows an additional conventional contact information screen that is configured to prompt or allow the customer service agent to input additional contact information for this newly entered contact such as, for example, telephone numbers 502 at (1), email addresses 504 and physical addresses 506. The customer service agent, having found the customer and having creating a new contact for that customer, may now proceed, as shown in FIG. 6, to create (add) a trouble ticket (alternately called case, service request and similar phrases) that will hold the particulars of the matter about which contact Alan Fletcher is calling, as shown at (1).

Another conventional approach is shown in FIGS. 7-12. As shown in FIG. 7, a person called Jed calls the call center on behalf of a customer he identifies as being Softgear, Inc. The customer service agent may then enter the customer name at 702 and the contact's name at 704, as shown at (1) and (2) in FIG. 7. As shown at 706, in this scenario, no customers with associated contacts are found for the entered search criteria "Softgear" and "Jed". The customer service agent may then attempt to broaden the search by the contact name "Jed" and searching only on the customer name "Softgear" as shown at 802 to attempt to retrieve the customer name, as shown at (1) in FIG. 8. As shown in FIG. 9 at (1), in the event that the results box displays more than one customer, the customer service agent may then select the appropriate company as shown at (2), often by asking the caller another question, such as "Are you calling from Dallas or Philadelphia?", to distinguish between related entries for a single customer (Softgear, Inc. of Dallas or Softgear International, LTD of Philadelphia in the example developed herein). Selecting the appropriate company allows the customer service agent to view the company information, as shown in FIG. 9. As shown at 902, the company information may include a listing of the five existing contacts for that customer, as shown at 902. The customer service agent may then select "Contacts" 902 from the company information, as shown at (1), which may then bring up a screen displaying existing contacts for customer "Softgear" are shown at 1002 in FIG. 10. After the customer service agent does not find "Jed" as an existing customer, he or she may add a new contact record for Jed Pottage, as shown at 1102 in FIG. 11 at (1). In this approach the contact information must be retyped, as it was lost in order to find only customers that matched the name Softgear. Creating the new contact for Jed Pottage allows the customer service agent to create a new trouble (case) ticket for contact Jed Pottage, as shown at 1202 in FIG. 12 at (1).

Figure 13:
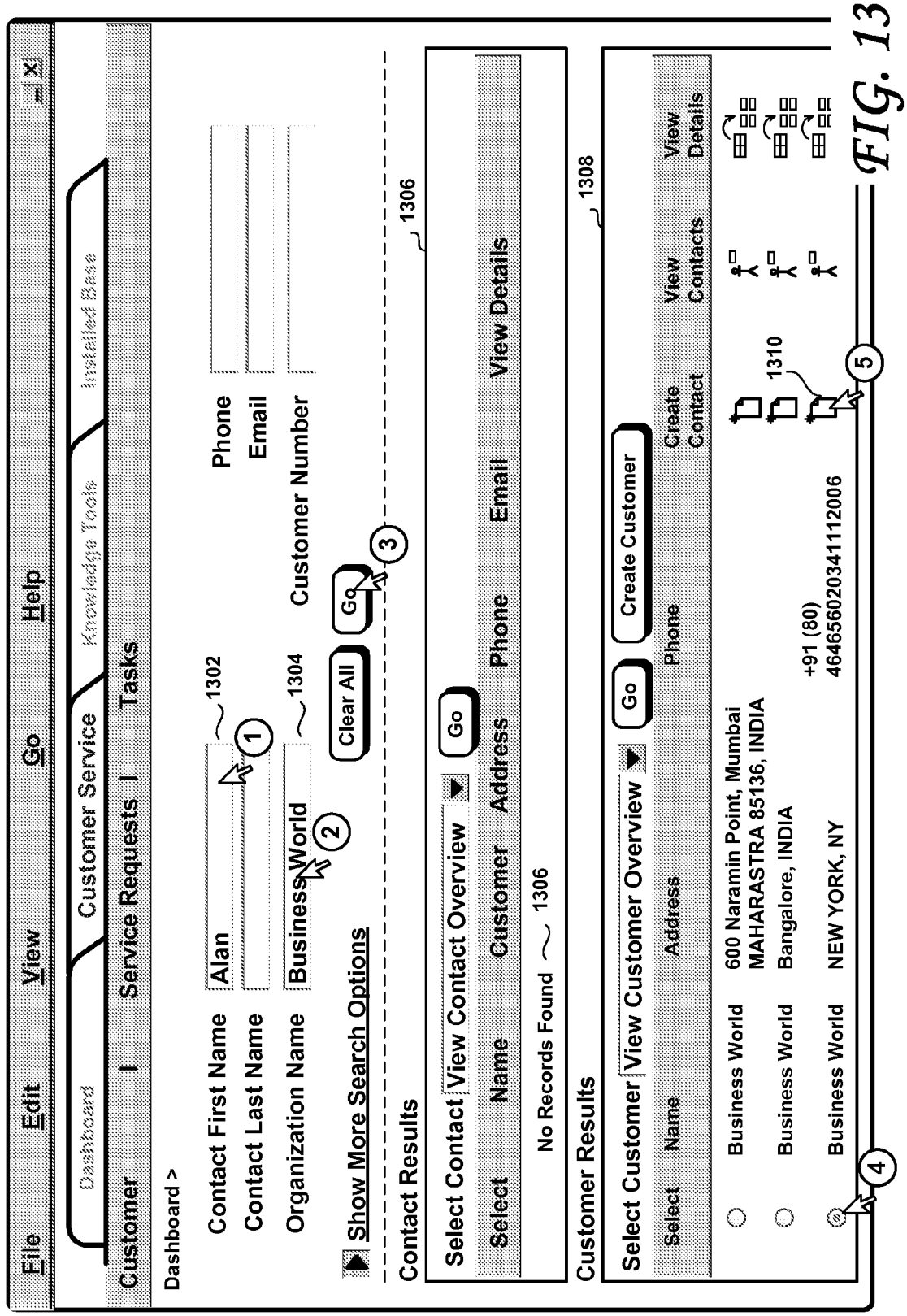
FIG. 13 shows aspects of a computer-implemented method for a call center to search for and display both contact and customer information on a single display screen, according to an embodiment of the present invention.

Efficient searching and displaying of contact and customer information is a sure fire way to reducing costs at most contact centers, and is also a very common function for most users of Customer Relationship Management (CRM) applications. Contact center users in particular are under unrelenting and wholly un-elastic time-based pressures, as every second saved on a call has the potential to save a great deal of money for the corporation, when such time savings are aggregated over a great many customer service agents over time. While all contact centers have different processes, all contact centers start their process off with some form of manual or automated searching. Embodiments of the present invention are described hereunder with reference to FIGS. 13-16, relative to an example in which a contact Alan from customer Business World calls a contact center to report a problem. In this example, one of the customer service agent's goals is to quickly create a service request (which also may be variously referred to as a new trouble ticket or new case). As shown in FIG. 13, the customer service agent may perform a search, using the contact's name 1302 inputted at (1) and the customer 1304 (given to the agent by the contact) inputted at (2) as search criteria. The customer service agent may then initiate the search using the inputted search criteria, as shown at (3). In this example, the search based upon the contact name and customer search criteria did not result in any matches for Alan as a contact name for the Business World customer, as shown in the contact search results box 1306, but did result in a number of matches for the customer Business World, as shown in the customer search results box 1308. Note that, within the context of the present invention, the term "box" is intended to include within its scope any result set or group of results displayed on a screen and/or otherwise provided to the customer service agent or other user. Indeed, the phrase "contact search result box" refers generally to a displayed set of contacts as a result of carrying out a search (however such results are rendered or formatted on the screen). Similarly, the phrase "customer search result box" refers generally to a displayed set of customers as a result of carrying out a search (however such results are rendered or formatted on the screen). Note that the user interface screen shown in FIG. 13 is configured to enable the customer service agent to enter the available search criteria, to display any existing contacts in a contact search results box 1306 and to display any existing customers matching the entered search criteria in a customer search results box 1308. It is also to be noted that enabling contact and customer search functionality and displaying both contact search results and customer search results on a single user interface screen (or in any manner that allows the customer service agent to view both the contact search results box and the customer search results box at the same time) effectively bypasses a number of steps that were previously necessary in conventional implementations and streamlines the process of creating a service request when a contact and/or a new customer must be created. For example, the embodiment shown in FIG. 13 effectively bypasses the steps of creating a new company and then searching if that company already exists in the database, as shown in FIGS. 2 and 3. Returning to FIG. 13, the customer results search box 1308 may display several customers that match the search criteria "Business World". In this example, the name Business World appears to be associated with three different locations; namely, Mumbai and Bangalore in India and New York City in the United States. Although each of these may be related to a single corporate entity, they may nevertheless be separately listed as customers in the call center, to distinguish between them. While contact Alan is on the telephone, the customer service agent may ask from where he is calling from, if such has not already been collected from data extracted from Interactive Voice Response (IVR) data, Automatic Number Identification (ANI) data, call arrival time, CallerID data and/or Dialed Number Identification Service (DNIS), for example. For example, the customer service agent may simply ask the caller "Do you work for Business World New York?" In any event, the customer service agent may then select the appropriate one from among the displayed customers in the customer search results box 1308, as shown at (4) in FIG. 13.

As no contacts matching the search criteria Alan were retrieved in this example, the customer service agent may create a new contact before a service request may be generated. This functionality also may be carried out from the same user interface screen from which the customer service agent searched for the contact and/or customer and that displayed the search results; namely the contact search results box 1306 and the customer search results box 1308. Indeed, the customer service agent may click on or otherwise select at (5) the icon 1310 under the "create Contact" column of the customer results search box 1308 to create a new contact for the customer selected at (4). Continuing with the present example, the customer service agent may click on the "Create Contact" icon as shown at 1310 to create a new contact for the inputted contact name search criteria (since no contact of that name currently exists in the call center database—or the database accessed by the call center in carrying out its functions).

Figure 14:
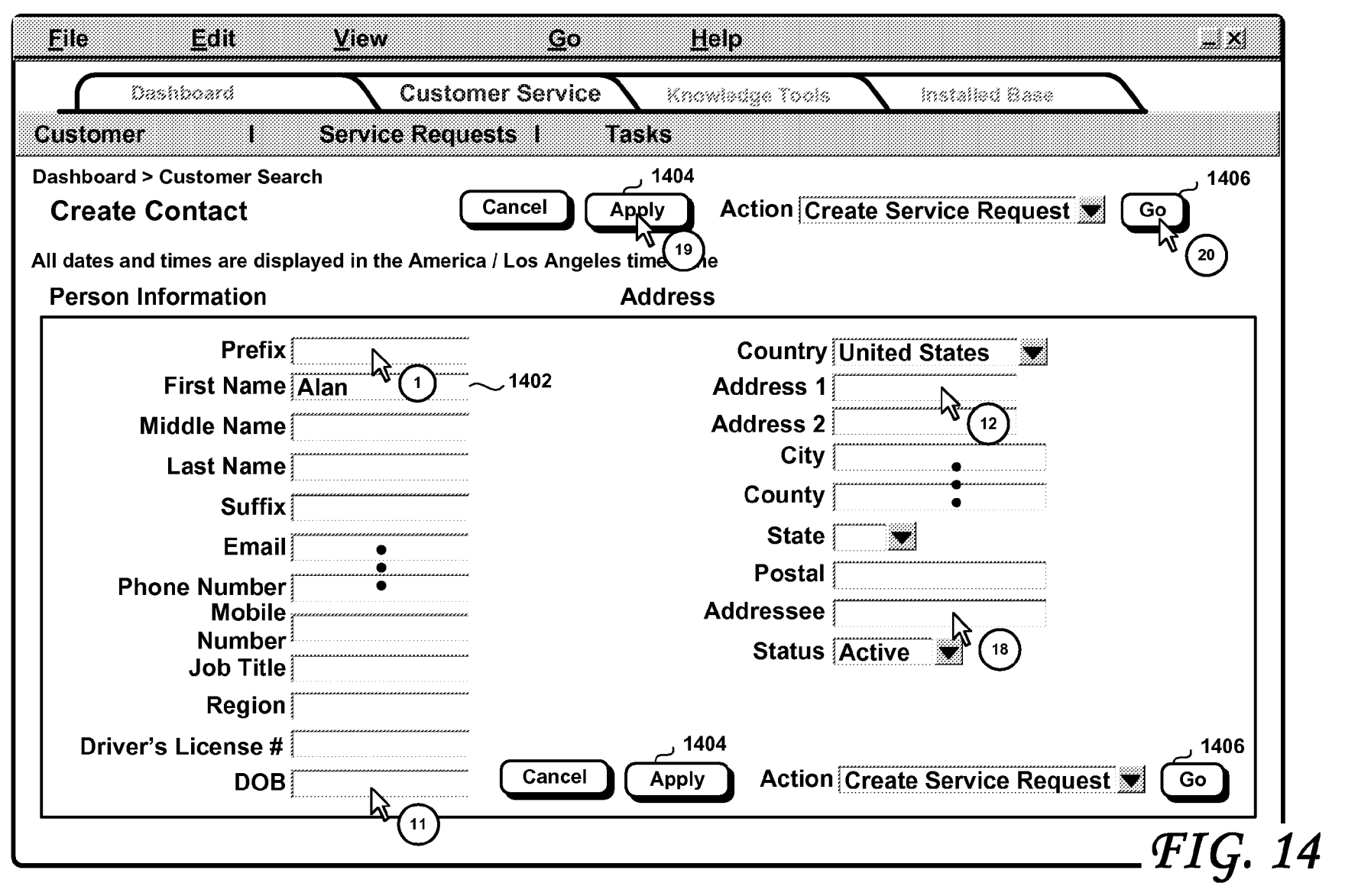

Having clicked on the Created Contact icon 1310 for the selected customer listed in the customer search results box 1308, a new user interface screen may be displayed as shown in FIG. 14, allowing the agent to enter additional contact information that the caller (Alan in this example) may have provided. Note that the contact name search criteria may advantageously be imported into the appropriate field from the user interface screen of FIG. 14. If additional contact information has been extracted from IVR data, ANI data, call arrival time, CallerID data and/or DNIS, such may also be used to pre-populate the fields of the Create Contact user interface screen of FIG. 14. The customer service agent may ask the caller questions to fill in all or some of the fields shown in FIG. 14, as shown at (1) through (18). Thereafter, the customer service agent may create the contact with the populated and entered information by clicking on or otherwise selecting at (19) the "Apply" button 1404 or functional equivalent. After the new contact has been created, the customer service agent may then create the service request (trouble ticket, case), as shown at (20) by clicking or otherwise selecting the Create Service Request selection 1406.

FIG. 15 shows aspects of a computer-implemented method for a call center to search for a customer, according to an embodiment of the present invention. As shown therein, the customer service agent may input all or a portion of the caller's first name 1502 as shown at (1), all or a portion of the caller's last name 1504 as shown at (2) and/or all or part of the organization name 1506 (in this case, Business World) and click Go as shown at (3) to search for customers that match the inputted search criteria. In the Contacts for Multiple Customers search results box 1508, one or more contacts that match the inputted criteria may be displayed, based on phonetically and "nickname" matching rules. The displayed contacts may be individually selectable, as shown at (4). On the same user interface screen, a Customers Results search box 1510 may be displayed to show any customers (e.g., organization) that match one or more of the inputted criteria. Once the customer service agent recognizes the caller from those displayed in the Contacts for Multiple Customers search box 1508, he or she may select such recognized contact as shown at (4). Alternatively, the customer service agent may select the View Customer Overview to display an overview of the customer selected in the Customer Results search box 1510. Alternatively still, the customer service agent may create a new customer from within the Customers Results search box 1510. In any event, when the desired contact is selected from the Contacts from Multiple Customers search box 1508, the customer service agent may create a new service request as shown at (5), directly from the same user interface screen from which the search for the contact was initiated. This enables the customer service agent to create a service request (trouble ticket, case number, etc.) without first having the contact overview screen (as shown in FIG. 6) being displayed, thereby achieving further time efficiencies.

FIG. 16 shows aspects of a computer-implemented method for a call center to search for a customer, according to an embodiment of the present invention. As shown therein, the customer service agent may input all or a portion of a known phone number 1602 as shown at (1) and click Go as shown at (2) to search for contact and customers that have a phone number ending in the search criteria. It is advantageous to search on the last digits of a phone number as the first digits are not always passed in from data extracted from Interactive Voice Response (IVR) data, Automatic Number Identification (ANI) data, call arrival time, CallerID data and/or Dialed Number Identification Service (DNIS), for example. It is also advantageous to allow an agent to type in only the last digits of a phone number as these are the most likely to result in an exact match by being unique, which thereby saves the agents time.

As shown and described herein, embodiments of the present invention allow a customer service agent to specify a single set of criteria, including, for example, the customer and contact names and to simultaneously display (e.g., in a same or adjacent window, such as a window of a web browser) any matching contacts known to represent existing customers, as well as all matching customers. Using such displayed information, known relationships between customers and contacts may be displayed. If there is a known relationship between a contact and customer, then the agent may select that to see details of a selected displayed customer or a selected displayed contact. Alternatively, the customer service agent may select an action to be performed based on the displayed customer(s) and/or contact(s) such as, for example, updating address information or creating a new service request. For example, based upon a set of inputted criteria, known customers may be displayed. The customer service agent may then select one of the displayed customers see and/or edit details of the selected customer, or indicate what action should be performed based on that customer such as, for example, creating a new contact relationship, viewing all known contact relationships for that customer and/or updating address book information for that customer. The search criteria may be revised and executed again to start over or to refine the search to cut down on the number of search results (e.g., customers and customer) returned, or the search results may be navigated through one set at a time. When the search criteria inputted by the customer service agent do not return any or the desired results, a new customer may be entered, together with one or more new contacts for the new customer.

When a customer service agent searches for a contact, and no results are found, the agent may confirm the spelling of the search criteria. Embodiments of the present invention allows an agent to readily determine whether any customers and/or contacts exist based on the search criteria, thereby minimizing the need to confirm that the customer name was spelled correctly. This is because embodiments of the present invention enable both matching contacts (if any) and matching customers (if any) to be displayed together. If the customer is displayed, the customer service agent may click on or otherwise select the customer to display all of the contacts for the selected customer. In this manner, embodiments of the present invention also avoid the customer service agent initiating a second search just for the customer, which saves time and more importantly encourages the agent to leverage existing data rather than creating a new (and potentially duplicate) record for the customer. In addition, embodiments of the present invention enable the customer service agent, while creating a new customer, to retain the contact name information already typed in during the search, to minimize the time needed to create the new contact record (whenever a new customer is created, it is reasonable to presume a new contact must always be created if the customer is an organization, with the same information that was used in the original search).

When the customer and contact are already captured in the system, embodiments of the present invention allow agents to either select a search result, or to select an action (e.g., create a new contact for an existing customer, create a service request, trouble ticket, new case and the like) based on the result. For example, instead of the customer service agent selecting (e.g., clicking on) the existing contact and viewing a display showing the contact information, the agent may indicate that he or she wishes to create a Service Request (or perform some other action) for the contact without viewing the detailed contact information screen, which avoids an unwanted intermediary display that must be generated by the system and viewed by the customer service agent.

The utility of embodiments of the present invention is not limited to large call centers. Indeed, embodiments of the present invention may be advantageously deployed in such fields as, for example, medical systems where a medical professional calls on behalf of a patient, product searches where optional accessories might be sold with the base product, or any situation in which it would be advantageous to display related information (such as contact and customer information discussed in the examples developed herein) based upon a search carried out subsequent to the input of search criteria.

Figure 17:
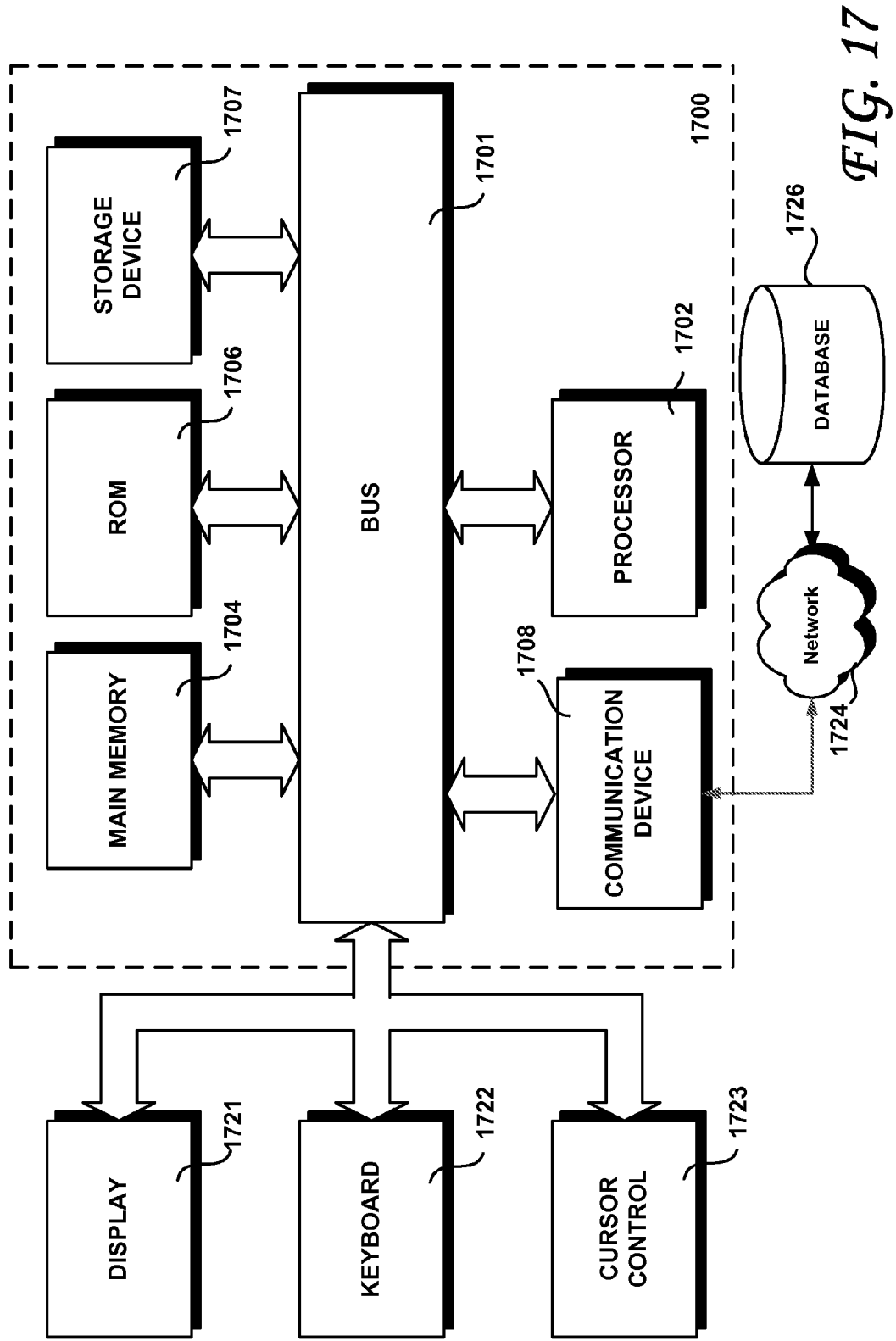
FIG. 17 is a block diagram of a computer system with which embodiments of the present invention may be practiced.

FIG. 17 illustrates a block diagram of a computer system 1700 upon which embodiments of the present inventions may be implemented. Computer system 1700 may include a bus 1701 or other communication mechanism for communicating information, and one or more processors 1702 coupled with bus 1701 for processing information. Computer system 1700 further comprises a random access memory (RAM) or other dynamic storage device 1704 (referred to as main memory), coupled to bus 1701 for storing information and instructions to be executed by processor(s) 1702. Main memory 1704 also may be used for storing temporary variables or other intermediate information during execution of instructions by processor 1702. Computer system 1700 also may include a read only memory (ROM) and/or other static storage device 1706 coupled to bus 1701 for storing static information and instructions for processor 1702. A data storage device 1707, such as a magnetic disk or optical disk, may be coupled to bus 1701 for storing information and instructions. The computer system 1700 may also be coupled via the bus 1701 to a display device 1721 for displaying information to a computer user. An alphanumeric input device 1722, including alphanumeric and other keys, may be coupled to bus 1701 for communicating information and command selections to processor(s) 1702. Another type of user input device is cursor control 1723, such as a mouse, a trackball, or cursor direction keys for communicating direction information and command selections to processor 1702 and for controlling cursor movement on display 1721. The computer system 1700 may be coupled, via a communication device (e.g., modem, network interface card) coupled to a network 1724, to a database 1726 configured to store the customer, contact and other information accessed by customer service agents in carrying out steps according to embodiments of the present invention.

Embodiments of the present invention are related to the use of computer system and/or to a plurality of such computer systems to enable methods and systems for facilitating retrieval and viewing of customer and contact information by call centers. According to one embodiment, the methods and systems described herein may be provided by one or more computer systems 1700 in response to processor(s) 1702 executing sequences of instructions contained in memory 1704. Such instructions may be read into memory 1704 from another computer-readable medium, such as data storage device 1707. Execution of the sequences of instructions contained in memory 1704 causes processor(s) 1702 to perform the steps and have the functionality described herein. In alternative embodiments, hard-wired circuitry may be used in place of or in combination with software instructions to implement the present invention. Thus, the present invention is not limited to any specific combination of hardware circuitry and software. Indeed, it should be understood by those skilled in the art that any suitable computer system may implement the functionality described herein. The computer system may include one or a plurality of microprocessors working to perform the desired functions. In one embodiment, the instructions executed by the microprocessor or microprocessors are operable to cause the microprocessor(s) to perform the steps described herein. The instructions may be stored in any computer-readable medium. In one embodiment, they may be stored on a non-volatile semiconductor memory external to the microprocessor, or integrated with the microprocessor. In another embodiment, the instructions may be stored on a disk and read into a volatile semiconductor memory before execution by the microprocessor.

While the foregoing detailed description has described preferred embodiments of the present invention, it is to be understood that the above description is illustrative only and not limiting of the disclosed invention. Those of skill in this art will recognize other alternative embodiments and all such embodiments are deemed to fall within the scope of the present invention. Thus, the present invention should be limited only by the claims as set forth below.

What is claimed is:

1. A method for facilitating interactions made with customer service agents of an organization, the method comprising:
    receiving, at the one or more computer systems, search criteria that include at least one of contact information and customer affiliation information;
    searching a database, using the one or more computer systems, based upon the search criteria to retrieve information associated with one or more customer records and one or more contact records from the searched database that satisfies all or part of the search criteria, wherein each customer record corresponds to a business entity and each contact record corresponds to an individual different from the business entity; and
    receiving, at the one or more computer systems, first information relating to a set of contact records retrieved from the database as a result of the search of the database;
    receiving, at the one or more computer systems, second information a set of customer records retrieved from the database as a result of the search of the database; and
    generating, using the one or more computer system, information configured for simultaneously displaying on a single graphical user interface first search results in a first portion of the graphical user interface that lists the set of contact records based on the first information and second search results in a second portion of the graphical user interface that lists the set of customer records based on the second information.

2. The method of claim 1, further comprising receiving, at the one or more computer systems, a selection of a contact record made within the first search results from the list of the set of contact records.

3. The method of claim 2, further comprising generating information configured for displaying within the first portion of the graphical user interface a selection of possible actions that a customer service agent may take on the selected contact record.

4. The method of claim 3, wherein generating the information configured for displaying the selection of possible actions within the first portion of the graphical user interface includes generating information configured for displaying an action to view detailed contact information, an action to update contact information, an action to create an order, and an action to create a service request for the selected contact record.

5. The method of claim 1, further comprising creating, using the one or more computer systems, a service request for a contact record displayed within the first search results.

6. The method of claim 1, further comprising receiving, at the one or more computer systems, a selection of a customer made within the second search results from the list of the set of customer records.

7. The method of claim 6, further comprising generating information configured for displaying within the second portion of the graphical user interface a selection of possible actions that a customer service agent may take on the selected customer record.

8. The method of claim 7, wherein generating the information configured for displaying the selection of possible actions within the first portion of the graphical user interface includes generating information configured for displaying an action to view detailed customer information, an action to update customer information, an action to create a service request for the selected customer, an action to create an order, and an action to display all contacts for the selected customer record.

9. The method of claim 1, further comprising creating, using the one or more computer systems, a service request for a customer record displayed within the second search results.

10. The method of claim 1, further comprising generating, using the one or more computer systems, information configured for displaying another graphical user interface incorporating at least some of the received search criteria into selected fields of a new contact record creation screen.

11. A non-transitory computer-readable storage medium having data stored thereon representing sequences of instructions which, when executed by a computing device, causes the computing device to retrieve and display customer records and contact records from a database coupled to a computer system, the computer-readable storage medium comprising:
    instructions for receiving search criteria that include at least one of contact details and a customer;
    instructions for initiating a search of the database coupled, to the computer system to retrieve information associated with one or more customer records and one or more contact records from the database that satisfies all or part of the search criteria, wherein each customer record corresponds to a business entity and each contact record corresponds to an individual different from the business entity;
    instructions for retrieving a set of customer records and a set of contact records from the searched database as a result of the search of the database; and
    instructions for generating information configured for simultaneously displaying on a single screen first search results in a first portion of a graphical user interface that lists the set of contact records and second search results in a second portion of the graphical user interface that lists the set of customer records.

12. The non-transitory computer-readable storage medium of claim 11, further comprising instructions for receiving a selection of one of the displayed contact records from the customer service agent.

13. The non-transitory computer-readable storage medium of claim 12, further comprising instructions for generating information configured for displaying a selection of possible actions in the first portion of the graphical user interface that the customer service agent may take on the selected one of the displayed contact records.

14. The non-transitory computer-readable storage medium of claim 13, wherein the instructions for generating the information configured for displaying the selection of possible actions in the first portion of the graphical user interface includes instructions for generating information configured for displaying detailed contact information, updating contact information, creating an order and creating a service request for the selected one of the displayed contact records.

15. The non-transitory computer-readable storage medium of claim 11, further comprising instructions for creating a service request for a contact record displayed in the first search results from the screen.

16. The non-transitory computer-readable storage medium of claim 11, further comprising instructions for receiving a selection of one of the displayed customer records from the customer service agent.

17. The non-transitory computer-readable storage medium of claim 16, further comprising instructions for generating information configured for displaying a selection of possible actions in the second portion of the graphical user interface that the customer service agent may take on the selected one of the displayed customer records.

18. The non-transitory computer-readable storage medium of claim 17, wherein the instructions for generating the information configured for displaying the selection of possible actions in the second portion of the graphical user interface includes instructions for generating information configured for displaying detailed customer information, updating customer information, creating a service request for the selected one of the displayed customers, creating an order and displaying all contacts for a selected customer record.

19. The non-transitory computer-readable storage medium of claim 11, further comprising instructions for creating a service request for a customer record displayed in the second search results from the screen.

20. A computer-implemented method of enabling a customer service agent of an organization to retrieve and view customer records and contact records from a database coupled to a computer system, the method comprising:
   receiving, at the computer system, search criteria that include at least one of contact details and a customer;
   initiating, using the computer system, a search of the database coupled to the computer system to retrieve information associated with one or more customer records and one or more contact records from the database that satisfies all or part of the search criteria, wherein each customer record corresponds to a business entity and each contact record corresponds to an individual different from the business entity;
   retrieving, using the computer system, a set of customer records and a set of contact records from the searched database as a result of the search of the database; and
   generating, using the computer system, information configured for simultaneously displaying on a single screen first search results in a first portion of a graphical user interface that lists the set of contact records and second search results in a second portion of the graphical user interface that lists the set of customer records.

21. A computer system for retrieving and displaying customer record and contact record from a database coupled to a computer system, the computer system comprising:
   at least one processor;
   at least one data storage device coupled to the at least one processor;
   a plurality of processes spawned by said at least one processor, the processes including processing logic for:
   receiving search criteria that include at least one of contact details and a customer;
   initiating a search of the database coupled to the computer system to retrieve information associated with one or more customer records and one or more contact records from the database that satisfies all or part of the search criteria;
   retrieving a set of customer records and a set of contact records from the searched database as a result of the search of the database, and
   generating information configured for simultaneously displaying on a single screen a first search results in a first portion of a graphical user interface that lists the set of contact records and second search results in a second portion of the graphical user interface that lists the set of customer records.

22. The method of claim 1, wherein the set of contact records and the set of customer records are received and displayed independent from each other.

* * * * *

UNITED STATES PATENT AND TRADEMARK OFFICE
CERTIFICATE OF CORRECTION

| | | |
|---|---|---|
| PATENT NO. | : 8,374,998 B2 | |
| APPLICATION NO. | : 11/456468 | |
| DATED | : February 12, 2013 | |
| INVENTOR(S) | : Vautier | |

It is certified that error appears in the above-identified patent and that said Letters Patent is hereby corrected as shown below:

On the Title page, Item (54) under "Title", and in the specification, Column 1, line 1, delete "COMPUTER IMPLEMENTED" and insert -- COMPUTER-IMPLEMENTED --, therefor.

In the Specifications:

In column 1, line 33, before "agents" delete "that".

In column 6, line 5, delete "(as" and insert -- as --, therefor.

Signed and Sealed this
Fourteenth Day of May, 2013

Teresa Stanek Rea
*Acting Director of the United States Patent and Trademark Office*